S. CROWELL.

Connecting and Supporting Stovepipe.

No. 58,717.

Patented Oct. 9, 1866.

Witnesses:

Inventor:

UNITED STATES PATENT OFFICE.

SOLOMON CROWELL, OF SYRACUSE, NEW YORK, ASSIGNOR TO HIMSELF AND JAMES B. RUE, OF SAME PLACE.

IMPROVEMENT IN CONNECTING AND SUPORTING STOVE-PIPE.

Specification forming part of Letters Patent No. 58,717, dated October 9, 1866.

*To all whom it may concern:*

Be it known that I, SOLOMON CROWELL, of the city of Syracuse, in the county of Onondaga and State of New York, have invented a new and useful Improvement for Connecting and Supporting Stove-Pipe or other Pipes; and I do hereby declare that the following is a full, clear, and exact description of the construction and operation of the same, reference being had to the annexed drawings, making a part of this specification, in which—

Figure 1:
Figure 2:
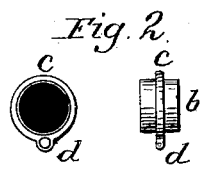

Figure 1 is a perspective view. Fig. 2 is an end and side view of the coupling.

Like letters represent like parts.

Letter $a$ represents the stove-pipe or other pipe, letter $b$ the coupling, letter $c$ the flange on the coupling, letter $d$ the eye projecting from the flange, and letter $e$ the tension-rod that passes through the eye $d$.

I make my flange and coupling of cast-iron or any other metal. The coupling is contracted at each end, so as to obviate any difficulty in inserting it into the pipe, as it is well known that pipe made at different places is not always made of the same size. The coupling projects about two inches from its center each way, which causes a support to the pipe without the assistance of the tension-rod.

The coupling is intended to be inserted in the ends of each length of the pipe used and made of the same size. The flange on the coupling projects above the surface of the coupling about one-half of an inch. When the coupling and pipe are connected, as represented in Fig. 1, and driven together, the pipe presses against each side of the flange of the coupling, thereby preventing any air from passing in the pipe between the flange and pipe, also obviating the difficulty which frequently arises in consequence of cold air rushing in the pipe from defects of the joints at the lengths of the pipe not fitting together air-tight; and it is well known that the common manner of making pipe is by grooving, and when put together, by one length of pipe lapping over the other, will leave a space open at every joint for the cold air to penetrate, which greatly affects the draft.

The tension-rod is inserted through the eye of the flange, extending from one end of the pipes to the other. On one end of the tension-rod is a cap or nut to keep the tension-rod from passing through the eye of the flange, and on the other end of the tension-rod is a thread cut, and a nut fits the thread, by which the tension-rod can be drawn tight, and when drawn tight the pipe will sustain itself suspended without any additional tie above, or in any other way attached to the pipe.

What I claim as my invention, and desire to secure by Letters Patent, is—

The coupling $b$, and the flange on the coupling $c$, and the tension-rod $e$, when the same are constructed, combined, and used in the manner as substantially set forth and described.

SOLOMON CROWELL.

Witnesses:
Z. C. FOOT,
LOUIS F. SMITH.